United States Patent Office 2,816,901
Patented Dec. 17, 1957

2,816,901

ORGANIC COMPOUNDS

Vladimir Petrow, Isobel Ann Stuart-Webb, and Dady Kawashaw Patel, London, England, assignors to The British Drug Houses Limited, London, England, a British company No Drawing. Application November 26, 1956,
Serial No. 624,231

Claims priority, application Great Britain
December 7, 1955

11 Claims. (Cl. 260—397.4)

This invention is for improvements in or relating to organic compounds, and has particular reference to a new 6-hydroxy-3:5-cyclosteroid which is of considerable value in the treatment of certain mental disorders.

It is an object of the present invention to provide the new compound 6-hydroxy-3:5-cyclopregnan-20-one (I):

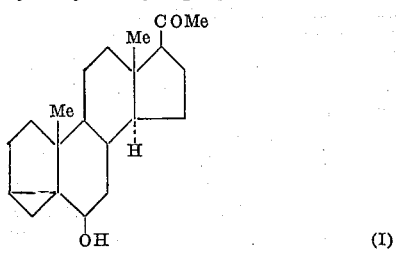

It is also an object of the invention to provide processes for the preparation of this compound.

A further object of the invention is to provide pharmaceutical preparations comprising the new compound.

According to the present invention, 6-hydroxy-3:5-cyclopregnan-20-one (I) may be prepared by a process comprising heating a pregnenolone arylsulphonate or methyl pregnenolone sulphate with an alkali metal salt of a weak acid, water and a water-soluble organic liquid.

The preferred process for the preparation of the new cyclosteroid comprises heating pregnenolone toluene-p-sulphonate with potassium acetate solution. A further suitable pregnenolone arylsulphonate is pregnenolone benzenesulphonate. Preferred water-soluble organic liquids are acetone, methyl ethyl ketone and dioxan. The reaction may be carried out under reflux.

The invention also provides a process for the preparation of 6-hydroxy-3:5-cyclopregnan-20-one (I) comprising heating pregnenolone sulphate, methyl pregnenolone sulphate or an alkali metal salt of pregnenolone sulphate with a neutral, slightly acid or slightly alkaline aqueous buffer solution. The aqueous solution is preferably covered with a layer of a water-immiscible organic liquid such as benzene or toluene, and the reaction may be carried out by refluxing the mixture, with stirring, for approximately 5 hours. The alkali metal pregnenolone sulphate may be potassium pregnenolone sulphate.

The invention further provides a process for the preparation of 6-hydroxy-3:5-cyclopregnan-20-one (I) comprising heating a pregnenolone arylsulphonate or methyl pregnenolone sulphate with a mixture of a lower aliphatic carboxylic acid anhydride having from 1 to 5 carbon atoms and an alkali metal salt of the corresponding acid, and hydrolysing the resulting 6-acyloxy-3:5-cyclopregnan-20-one. Suitable pregnenolone arylsulphonates are pregnenolone benzenesulphonate and pregnenolone toluene-p-sulphonate. The corresponding pregnenolone acylate is formed as a by-product in the first stage of this process.

Following is a description by way of example of methods of preparing the new cyclosteroid.

Preparation of intermediates having the general formula

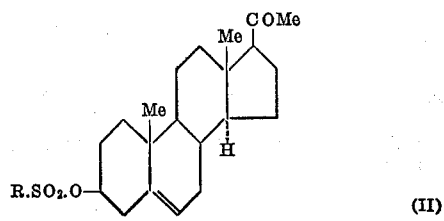

where R=e. g. Ph, p—Me.C$_6$H$_4$, Me, OH, or OX (where X is an alkali metal radical).

Pregnenolone benzensulphonate (II; R=Ph)—Pregnenolone (III)

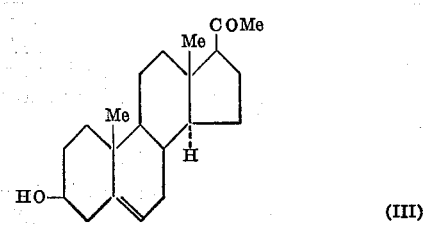

(5 g.) in pyridine (50 ml.) is treated with benzene sulphonyl chloride (redistilled, 5 ml.) and the solution is left overnight at room temperature. The mixture is then poured into water and the precipitated solids collected, washed with water and dried. Crystallisation from acetone/hexane furnishes pregnenolone benzenesulphonate, prisms, M. P. 144 to 145° C., $[\alpha]_D^{28}+14°$ (c, 0.537 in chloroform).

Pregnenolone toluene-p-sulphonate (II; R=Me.C$_6$H$_4$)—Pregnadienolone (7.8 g.) dissolved in pyridine (100 ml.) was left at room temperature overnight with toluene-p-sulphonyl chloride (7.8 g.). Water was added and the precipitate collected, washed with water and dried. Crystallisation from acetone gave pregnenolone-toluene-p-sulphonate, M. P. 147° C.

Potassium pregnenolone sulphate (II; R=OK)—Pregnenolone (5 g.), dry benzene (60 ml.), pyridine (6 ml.) and pyridine sulphur trioxide (5 g.) are heated to 60° C. and kept at that temperature for 20 minutes under anhydrous conditions, with stirring. The mixture is then cooled to room temperature and hexane (200 ml.) is added. After cooling to 0° C. and keeping at that temperature for several hours, the precipitated solids are collected, washed with hexane/benzene (5:1) and dried. The crude pyridinium pregnenolone sulphate (3 g.) suspended in water (60 ml.) is added with stirring to a solution of potassium chloride (6 g.) in water (60 ml.). After thorough mixing, the precipitated potassium salt is collected, washed with a little chloroform to remove unchanged starting material, and dried in vacuo. It melts at 226 to 228° C.

EXAMPLE I

Pregnenolone toluene-p-sulphonate (5 g.) is heated with potassium acetate (5.5 g.) in acetone (70 ml.) and water (70 ml.) under reflux for 8 to 18 hours. The reaction mixture is then poured into water and the product extracted with ether containing a little chloroform. The extract is dried and the solvent distilled off. The crude product is recrystallised from acetone, yielding 6-hydroxy-3:5-cyclopregnan-20-one, needles, M. P. 181° C., $[\alpha]_D^{24}+123°$ (c, 0.663 in chloroform). A further small crop of material may be obtained from the mother liquors by fractional crystallisation and/or chromatography on alumina.

EXAMPLE II

The procedure described in Example I is repeated, but the acetone is replaced by 70 ml. of methyl ethyl ketone, and the desired cyclosteroid is again obtained.

EXAMPLE III

Pregnenolone benzenesulphonate (5.7 g.) in acetone (80 ml.) and water (80 ml.) is heated with potassium acetate (6 g.) under reflux for 8 hours. The reaction mixture is then poured into water and extracted with ether. The extract is dried and the solvent distilled off. The crude product is recrystallised from acetone, furnishing 6-hydroxy-3:5-cyclopregnan-20-one, M. P. 180 to 181° C.

EXAMPLE IV

Potassium pregnenolone sulphate (500 mg.) in water (450 ml.) is made slightly alkaline with a few drops of dilute sodium carbonate solution (5%). Benzene (150 ml.) is added and the mixture is heated with stirring under reflux for 5 hours. The reaction mixture is then cooled, the upper layer separated, washed, dried and the solvent distilled off. The residue is recrystallised from acetone to yield 6-hydroxy-3:5-cyclopregnan-20-one, M. P. 180 to 181° C.

EXAMPLE V

Fused potassium acetate (10 g.) is dissolved in boiling acetic anhydride (150 ml.) and the solution is cooled to 50° C. Pregnenolone toluene-p-sulphonate (3.5 g.) is added, and the mixture heated on the steam-bath, with stirring, for 36 hours. The reaction mixture is then concentrated under reduced pressure, poured into water and extracted with ether. The ether extract is dried and treated with charcoal, filtered, and the ether distilled off. Recrystallisation of the crude residue from acetone/hexane affords a crop of pregnenolone acetate, which is removed. The motor liquor is then chromatographed on to alumina, and 6-acetoxy-3:5-cyclopregnan-20-one, prisms, M. P. 144 to 145° C., $[\alpha]_D^{24}+111°$ (c, 0.478 in chloroform) is obtained. The latter compound is submitted to alkaline hydrolysis (360 mg. in 18 ml. methanol and 4 ml. water is heated with 400 mg. potassium hydroxide under reflux for 2 hours). The product, isolated with ether, is trickled through a short alumina column in benzene solution and thereafter isolated and crystallised from acetone to yield the 6-hydroxy-3:5-cyclopregnan-20-one, M. P. 181° C.

The pharmaceutical preparations of 6-hydroxy-3:5-cyclopregnan-20-one may comprise the new cyclosteroid in admixture with a solid carrier, or as a suspension or solution in a liquid carrier.

Coated tablets suitable for oral administration may be prepared by mixing the cyclosteroid with a suitable mixture of solid carriers, granulating with starch paste, drying at 50° C., screening to remove fines, adding a lubricant and starch, mixing, compressing the resulting mixture into tablets, and applying a suitable enteric coating to the tablets.

Liquid preparations suitable for parenteral administration include sterile aqueous suspensions and sterile oily solutions.

Following is a description by way of example of pharmaceutical preparations comprising 6-hydroxy-3:5-cyclopregnan-20-one.

EXAMPLE VI

Tablets

| | | |
|---|---|---|
| 6-hydroxy-3:5-cyclopregnan-20-one | mg | 100 |
| Lactose | mg | 40 |
| Maize starch | mg | 30 |
| Maize starch (as 10% paste) | a sufficient quantity | |
| Tragacanth | mg | 2.5 |
| Magnesium stearate | mg | 2.0 |
| Dried maize starch | sufficient to produce 195 mg. | |

The first four ingredients are mixed and granulated with the starch paste. After drying at 50° C. the resultant granules are screened through a 20 mesh sieve, the fines below 40 mesh being removed. To a convenient quantity of the 20 mesh granulation is added the lubricant (magnesium stearate) and sufficient dried starch to produce the required weight. Tablets are compressed from this mixture, followed by the application of a suitable enteric coating. The coated tablets are suitable for oral administration.

EXAMPLE VII

| | | |
|---|---|---|
| 6-hydroxy-3:5-cyclopregnan-20-one | g | 100 |
| Sodium carboxymethyl cellulose | a sufficient quantity | |
| Polyoxyethylene sorbitan mono-oleate | g | 3 |
| Methyl hydroxybenzoate | g | 0.6 |
| Propyl hydroxybenzoate | g | 0.3 |
| Water for injection | sufficient to produce 1000 ml. | |

A convenient volume of water for injection containing the stated quantities of hydroxybenzoates is sterilised by autoclaving. The polyoxyethylene sorbitan mono-oleate and the steroid are placed in a ball mill together with approximately 250 ml. of the water. Sterilisation of the mill and its contents is carried out in an autoclave. Ball milling is then allowed to proceed until all the particles of the steroid hormone are reduced to the required size (not more than 15 μ at their greatest measurement), as judged by periodical microscopical examination of samples taken aseptically during the process. The milled dispersion is passed through a previously sterilised 100 mesh stainless steel sieve, followed by rinsing from the ball mill using sufficient of the remaining water to produce a volume of 500 ml. Sufficient of the remaining water is used to prepare 500 ml. of sterile solution containing sufficient sodium carboxymethyl cellulose to produce a viscosity of approximately 30 centistokes at 25° C. The aqueous dispersion of the steroid is then thoroughly mixed with the carboxymethyl cellulose solution, using aseptic precautions. The product is suitable for intramuscular injection.

EXAMPLE VIII

| | | |
|---|---|---|
| 6-hydroxy-3:5-cyclopregnan-20-one | g | 40 |
| Benzyl alcohol | ml | 100 |
| Ethyl alcohol | ml | 70 |
| Ethyl oleate | sufficient to produce 1000 ml. | |

The ethyl oleate is sterilised by heating at 160° C. for 1 hour, and allowed to cool. The benzyl and ethyl alcohols are then added, with aseptic precautions. The steroid is dissolved in the warm mixture at about 50° C., followed by clarification of the solution through a previously sterilised No. 2 sintered glass filter. Sealed ampoules or vials of the resulting solution are finally subjected to dry heat at 100° C. for 1 hour, and then cooled; the product is suitable for injection.

We claim:

1. A process for the preparation of 6-hydroxy-3:5-cyclopregnan-20-one said process comprising heating a pregnenolone aryl sulphonate with an alkali metal salt of a weak acid, water and a water-soluble organic liquid.

2. A process for the preparation of 6-hydroxy-3:5-cyclopregnan-20-one said process comprising heating pregnenolone toluene-p-sulphonate with potassium acetate in acetone and water under reflux for 8 to 18 hours.

3. A process for the preparation of 6-hydroxy-3:5-cyclopregnan-20-one said process comprising heating pregnenolone toluene-p-sulphonate with potassium acetate in methyl ethyl ketone and water under reflux for 8 to 18 hours.

4. A process for the preparation of 6-hydroxy-3:5-cyclopregnan-20-one said process comprising heating pregnenolone benzenesulphonate with potassium acetate in acetone and water under reflux for about 8 hours.

5. A process for the preparation of 6-hydroxy-3:5-cyclopregnan-20-one said process comprising heating an alkali metal salt of pregnenolone sulphate with a slightly alkaline aqueous buffer solution.

6. A process for the preparation of 6-hydroxy-3:5-cyclopregnan-20-one said process comprising making potassium pregnenolone sulphate slightly alkaline with a few drops of dilute sodium carbonate solution, adding benzene and heating said mixture with stirring under reflux for about 5 hours.

7. A process for the preparation of 6-hydroxy-3:5-cyclopregnan-20-one said process comprising heating a pregnenolone arylsulphonate with a mixture of a lower aliphatic carboxylic acid anhydride and an alkali metal salt of said corresponding acid and hydrolysing said resulting 6-acyloxy-3:5-cyclopregnan-20-one.

8. A process for the preparation of 6-hydroxy-3:5-cyclopregnan-20-one said process comprising dissolving fused potassium acetate in boiling acetic anhydride, cooling said solution to 50° C., adding pregnenolone toluene-p-suphonate and heating said mixture on a steam-bath with stirring for about 36 hours.

9. 6-hydroxy-3:5-cyclopregnan-20-one.

10. A pharmaceutical preparation comprising 6-hydroxy-3:5-cyclopregnan-20-one in admixture with a solid carrier.

11. A pharmaceutical preparation comprising 6-hydroxy-3:5-cyclopregnan-20-one in a liquid carrier.

No references cited.